United States Patent
Rios

(10) Patent No.: US 7,070,176 B1
(45) Date of Patent: Jul. 4, 2006

(54) ENCLOSED SPRING MECHANISM FOR TRAILER RAMP DOORS

(76) Inventor: Mario Rios, 30960 Green Branch St., Menifee, CA (US) 92584

( * ) Notice: Subject to any disclaimer, the term of this patent is extended or adjusted under 35 U.S.C. 154(b) by 0 days.

(21) Appl. No.: 10/672,031

(22) Filed: Sep. 26, 2003

(51) Int. Cl.
    *F16F 1/12* (2006.01)

(52) U.S. Cl. ............ 267/179; 49/372; 296/26.07; 296/57.1; 296/149

(58) Field of Classification Search ............ 267/179, 267/166, 178, 73, 286; 49/372, 131, 27, 49/348; 296/25, 26.07, 182.1, 183.1, 183.2, 296/50, 57.1, 55, 146.1, 147, 149
See application file for complete search history.

(56) References Cited

U.S. PATENT DOCUMENTS

| | | | | |
|---|---|---|---|---|
| 2,436,017 A | * | 2/1948 | Powers | 298/22 P |
| 3,464,161 A | * | 9/1969 | Jonsson | 49/197 |
| 3,983,387 A | * | 9/1976 | Van Steenhoven et al. | 362/375 |
| 5,185,977 A | * | 2/1993 | Brockman et al. | 52/173.2 |
| 5,384,975 A | * | 1/1995 | Yuran | 49/203 |
| 5,559,409 A | | 9/1996 | Beierwaltes et al. | 318/282 |

* cited by examiner

*Primary Examiner*—Pam Rodriguez
(74) *Attorney, Agent, or Firm*—John Joseph Hall

(57) ABSTRACT

A spring mechanism for a trailer ramp door which is adapted to be completely received in an opening in a side member of a tubular rectangular trailer rear entrance frame and with its bottom end securely attached to the inner surface of a flange extending along a side of the frame of the trailer ramp door and its top end securely attached through the opening to the inner surface of the side member, and the flange completely encloses the spring when the trailer ramp door is closed.

10 Claims, 2 Drawing Sheets

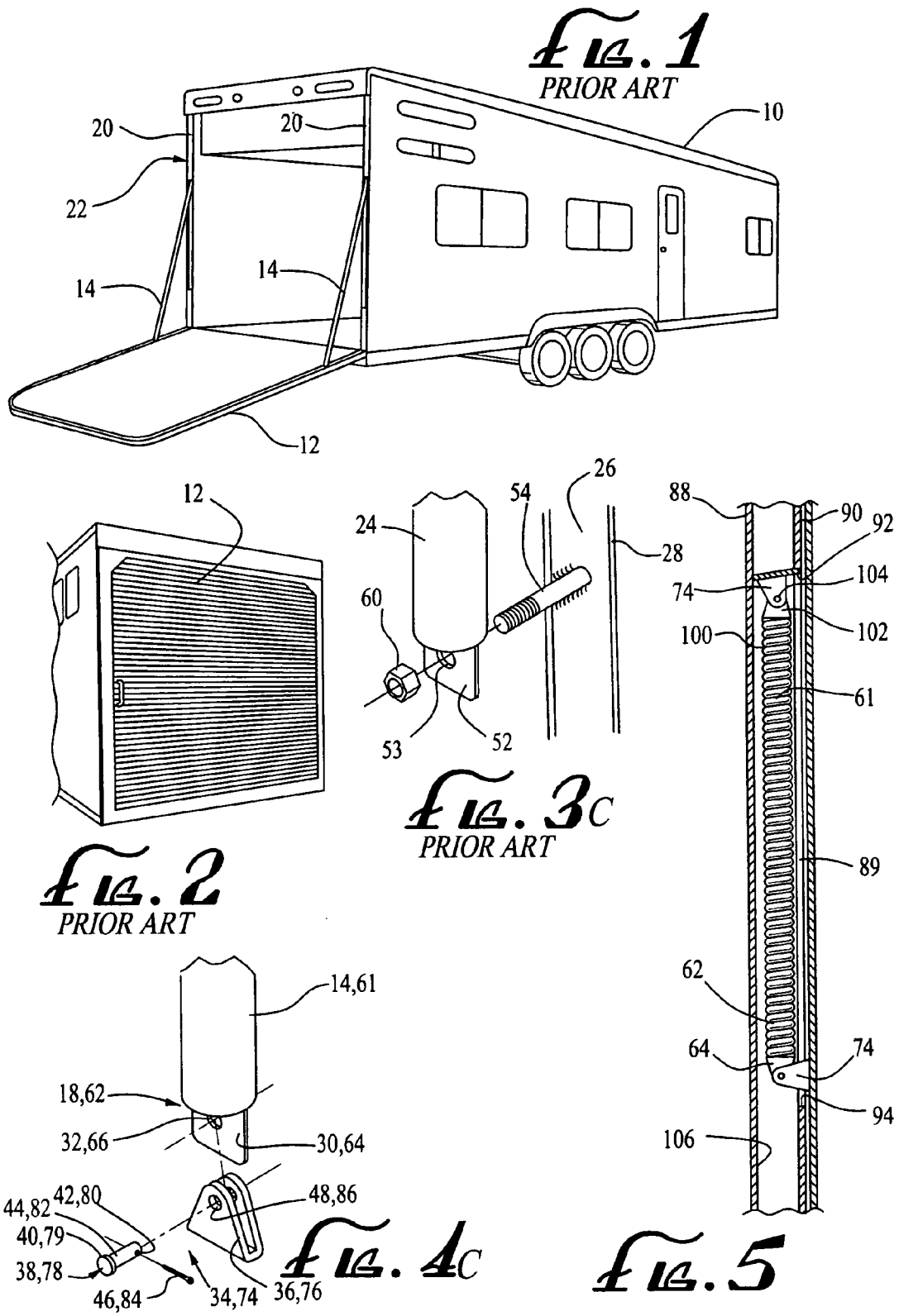

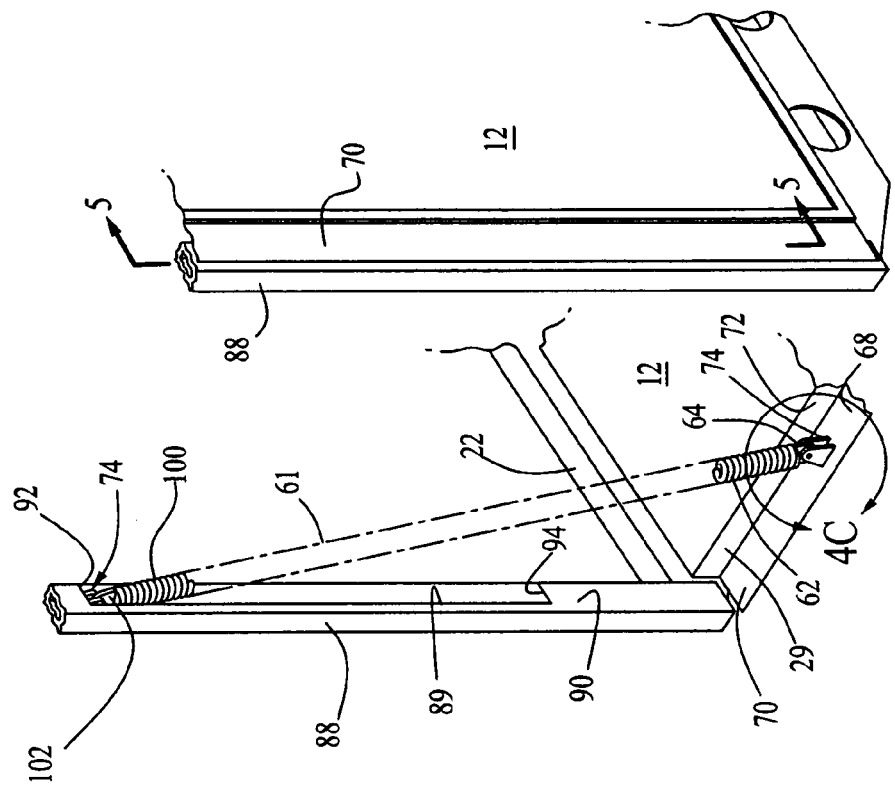
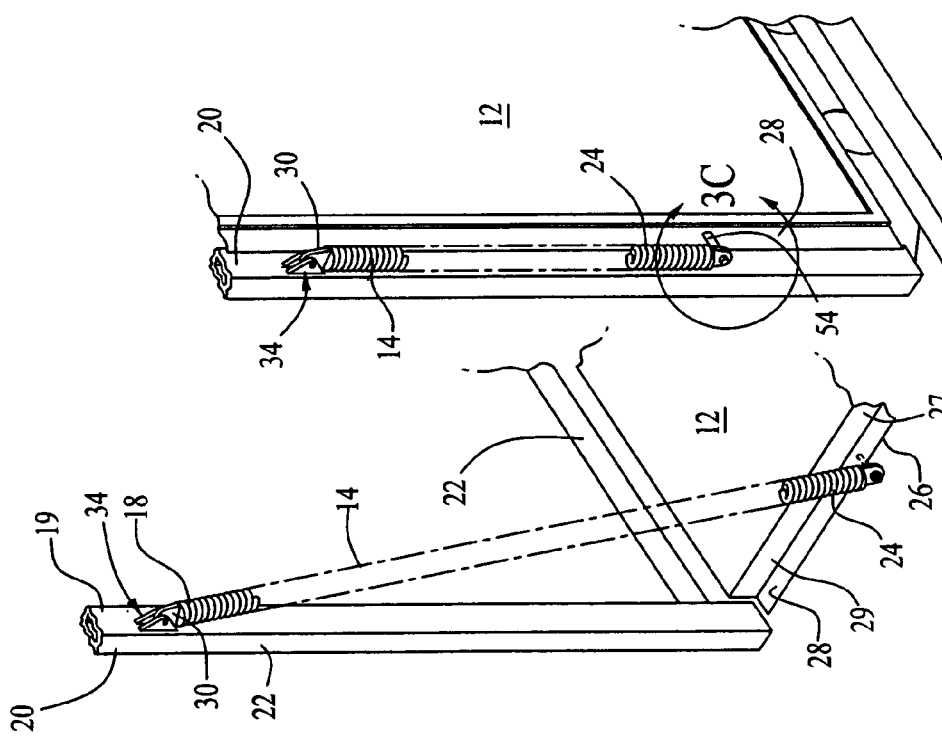

ENCLOSED SPRING MECHANISM FOR TRAILER RAMP DOORS

BACKGROUND OF THE INVENTION

1. Field of the Invention

This invention relates to spring mechanisms for opening and closing trailer ramp doors that are fully covered when the ramp doors are closed to prevent rusting and deterioration due to exposure to the elements.

2. Description of the Prior Art

Prior art spring mechanisms for trailer ramp doors as known to applicant have no protection from the elements when the ramp doors are closed and are thus subject to corrosion and rusting. Applicant is unaware of any prior art that provides a spring mechanism for trailer ramp doors that is fully enclosed when the ramp door is closed.

OBJECTS OF THE INVENTION

It is an object of this invention to provide a spring operated ramp door for trailers in which the spring is protected from corrosion or rusting due to exposure to weather elements.

Another object of this invention is to provide a spring mechanism to open and close a trailer ramp door which is hidden from view and protected from weather elements by enclosing it in a ramp door frame when the ramp door is in the closed position.

A further object of this invention is to improve safety in the operation of closing and opening a trailer ramp door by enclosing springs used to operate the ramp door in the trailer rear entrance frame.

A yet further object of this invention is to integrate spring mechanisms for opening and closing a trailer ramp door within the trailer rear entrance frame to facilitate movement of the ramp door.

BRIEF DESCRIPTION OF THE DRAWINGS

FIG. 1 is a rear perspective view of a conventional ramp trailer with its ramp door open.

FIG. 2 is a rear perspective view of a conventional ramp trailer with its ramp door closed.

FIG. 3A is a perspective view of a conventional or prior art ramp spring in its open position after the ramp door has been fully opened.

FIG. 3B is a perspective view of a conventional or prior art ramp spring in its closed position after the ramp door has been fully closed.

FIG. 3C shows the details of the prior art connection of the bottom end of a ramp spring.

FIG. 4A is a perspective view of an embodiment of the invention showing the ramp spring in its open position after the ramp door has been fully opened.

FIG. 4B is a perspective view of an embodiment of the invention showing the ramp spring fully enclosed after the ramp door has been fully closed thereby closing the ramp spring fully into a slot in the side of the ramp frame and hiding it from view.

FIG. 4c shows the details of the connection of the top end and bottom end of the ramp spring to be enclosed using a spring yoke assembly.

FIG. 5 is a cross sectional view taken along line 5—5 of FIG. 4B showing the ramp spring in its closed position after the ramp door has been fully closed.

DETAILED DESCRIPTION OF PRIOR ART AND A PREFERRED EMBODIMENT OF THE INVENTION

Prior Art

A conventional ramp trailer 10 is shown in FIG. 1 with its ramp door 12 in a fully open or down position. Conventional or prior art springs 14, one of which is shown in FIGS. 3B and 4B, are used in pairs to facilitate the opening and closing of ramp door 12. One prior art spring 14 is connected at its top end 18 to the outer surface 19 of each side member 20 of trailer rear entrance frame 22 and at its bottom end 24 to the outer surface 26 of each longitudinal flange 28 integrally formed on each side member 27 of ramp door frame 29 of ramp door 12. Trailer rear entrance frame 22 is preferably made of hollow rectangular steel tubing throughout its frame 22.

The top end 18 of prior art spring 14 terminates in a flat plate 30 having a hole 32 in its center. Each side member 20 of ramp door frame 22 has attached to it the top end 18 of prior art spring 14. A yoke assembly 34 is used for the attachment of the top end 18 and is made up of spring yoke 36, clevis pin 38 having a head 40 and a hole 42 in the tail end of its shaft 44, and cotter pin 46.

Spring yoke 36 is a unitary component in the form of two parallel triangularly shaped side members integrally joined at their widest side by a U-shaped arch, each side member having a hole 48 near its triangular apex.

Each top end 18 of each prior art spring 14 is secured to outer surface 19 of corresponding side member 20 of trailer rear entrance frame 22 as follows:

First, spring yoke 36 is securely mounted by any suitable means such as welding to the outer surface 19 of side member 20. Next, flat plate 30 is inserted into the space between side members of spring yoke 36 with hole 32 of flat plate 30 congruent with holes 48 of spring yoke 36. Then, clevis pin 38 is inserted through holes 48 and hole 32 of flat plate 30. Finally, cotter pin 46 is inserted into hole 42 in the tail end of clevis shaft 44, whereby each top end 20 of each prior art spring 14 is firmly secured to each corresponding side member 20 of trailer rear entrance frame 22.

Each bottom end 24 of each prior art spring 14 terminates in a flat plate 52 with a center hole 53.

Each bottom end 24 of each prior art spring 14 is securely attached to the outer surface 26 of each corresponding longitudinal flange 28 of ramp door frame 29. The attachment comprises a threaded rod 54 welded or otherwise securely mounted at its inner end to the outer surface 26 of longitudinal flange 28 and having its outer end inserted into hole 54 of flat plate 52. A hexagonal threaded nut 60 is threaded onto rod 54 to secure bottom end 24 of each prior art spring 14 to the outer surface 26 of longitudinal flange 28. When ramp door 12 is closed, thereby closing the flange 28 on each side member 20 of trailer rear entrance frame 22, springs 14 remain exposed to the elements since the closure of flanges 28 does not cover springs 14 at all as shown in FIG. 3B.

This arrangement permits corrosion and rusting of prior art springs 14 from precipitation of various types from weather conditions as well as exposure to sunlight, all of which shortens the life of prior art springs 14 and increases the danger of breakage of prior art springs 14.

PREFERRED EMBODIMENT OF THE INVENTION

The invention uses the same type of prior art springs 14, but has a different arrangement for them. For purposes of convenience and clarity, the springs of the invention will have a different identification number, 61.

Springs 61 are preferably 36 inches in length and have a diameter of 2.00 inches. A suitable type of spring used in the invention is identified as 3W36 garage door spring available from Century Spring Corp., 222 E. 16th Street, Los Angeles, Calif. 90015. This spring has a tensile strength of 165–185 lbs., and will withstand a maximum safe load of up to 340 lbs. This spring comes with each end terminating in a flat plate and is made of spring steel with a length of 36 inches and a diameter of 2 inches. Other springs may be used provided they have equal capabilities.

In the invention, the bottom ends 62 of springs 61, each terminating in a flat plate 64 with a central hole 66, are attached to the inner surfaces 68 of longitudinal flanges 70 integrally formed from each side member 72 of ramp door frame 29 as illustrated in FIG. 4A.

The width of longitudinal flanges 70 is preferably 3½ inches, but any other width that provides complete coverage of springs 61 may be used. The width of flanges 70 is almost twice the width of the prior art flanges 28.

This attachment is effected by a yoke assembly 74, comprising spring yoke 76, clevis pin 78 having a hole 80 in the tail end of clevis shaft 82, and cotter pin 84. The yoke assembly 74 is used to attach bottom ends 62 of springs 61 to longitudinal flanges 70 of ramp door frame 29.

Yoke assembly 74 has the same components and design of yoke assembly 34 but has new identification numbers for all of its component parts for purposes of convenience and clarity.

The bottom of spring yoke 76 is securely attached to the middle of the inner surface 68 of flange 70 by welding or other suitable means. Flat plate 64 of spring 61 is inserted into spring yoke 76 and kept in position by insertion of clevis pin 78 having a head 79 through holes 86 of spring yoke 76 and hole 66 of plate 64. Clevis pin 78 is secured by inserting cotter pin 84 into hole 80 at the tail end of clevis pin 78, whereby each spring 61 is securely attached to the middle of the width of corresponding inner surface 68 of a longitudinal flange 70 at a location preferably about 20 inches from the bottom of ramp door frame 29. This location may be varied up or down up to several inches depending on the length of springs 61 and their strength.

The invention has modified the tubular rectangular side members 20 of trailer rear entrance frame 22 to produce side members 88 by cutting longitudinal slots 89 in the outer surface 90 of side members 88. The slots 89 are preferably 45 inches long and 2¼ inches wide. The side members 88 are about 2 inches deep. Other dimensions may be used so long as the slots 89 are able to contain springs 61 that are completely closed by flanges 70 when ramp door 12 is closed.

The tops 92 of slots 89 are preferably located about 64 inches from the bottom of trailer rear entrance frame 22. However, the location may be varied up to several inches up or down depending upon the length of springs 61 in relation to the length of slots 89 and their strength.

Similarly, the bottoms 94 of slots 89 are preferably located about 19 inches from the bottom of trailer rear entrance frame 22 but this distance may be varied up or down several inches depending on the length of the springs 61 and length of slots 89.

The top ends 100 of springs 61 each terminate in flat plates 102 having holes 104 in their centers. Another set of yoke assemblies 74 are used to securely attach top ends 100 to the inner surfaces 106 of each side member 88 by introducing top ends 100 through slots 89.

Spring yoke 76 is securely mounted by any suitable means such as welding to the inner surface 106 of side member 88. Next, flat plate 102 is inserted into the space between side members of spring yoke 76 with hole 104 of flat plate 102 congruent with holes 86 of spring yoke 76. Then, clevis pin 78 is inserted through holes 86 and hole 104 of flat plate 30. Finally, cotter pin 84 is inserted into hole 80 in the tail end of clevis shaft 82, whereby each top end 100 of each spring 61 is firmly secured inside slot 89 to the inner surface 106 of each corresponding side member 88 of trailer rear entrance frame 22.

In operation, when ramp door 12 is being opened and is being lowered to a completely flat position, springs 61 provide dampening of the downward movement of ramp door 12 which provides a controlled motion of ramp door 12 as it moves down.

When ramp door 12 is being closed from its completely open position, springs 61 provide substantial lifting assistance since ramp door 12 weighs about 180 pounds.

When ramp door 12 is completely closed, springs 61 are completely enclosed in slots 89 by flanges 70 and are protected from corrosion or rusting from weather elements, thereby substantially increasing the life of springs 61, and providing safety to consumers in the event of any breakage of springs 61.

Although I have described the invention in detail with reference to the accompanying drawings illustrating preferred embodiments of the invention, it is understood that numerous changes may be made in the details of construction and arrangement of parts without departing from the spirit and scope of the invention as hereinafter claimed.

I claim:

1. Spring mechanism assemblies which facilitate the movement of a trailer ramp door, and having spring mechanisms that are completely protected from weather elements when said trailer ramp door is closed, comprising:

a pair of elastic spring means each having a top end and a bottom end, said elastic spring means providing dampening of the downward movement of said trailer ramp door and providing lifting assistance for the upward movement of said trailer ramp door;

a pair of side members of a trailer rear entrance frame to which said trailer ramp door is attached, said pair of side members each having openings formed on each of their top surfaces, each of said openings formed to receive each of said elastic spring means and formed to completely enclose each of said elastic spring means in conjunction with said trailer ramp door when said trailer ramp door is closed;

means for securely attaching each said top end of each of said elastic spring means separately inside each of said openings; and means for securely attaching each said bottom end of each of said elastic spring means separately to the inner surface of each of two flange members, each flange member being formed from and extending outwardly from each side of said trailer ramp door;

whereby said elastic spring means facilitate both the opening of said trailer ramp door and the closing of said trailer ramp door, and said closing of said trailer ramp door inserts each of said elastic spring means into each of said openings and simultaneously causes each of said flange members to completely cover each of said elastic spring means while inserted in each of said openings, thereby completely enclosing each of said elastic spring means in each of said openings and providing complete protection of said elastic spring means from weather elements.

2. Spring mechanisms as defined in claim 1, in which said means for securely attaching each said top end comprises:
a pair of yoke members each of which securely holds each of said top ends of said elastic spring means, each of said yoke members being inserted into one of said openings and securely attached to the inner surface of one of said side members of said trailer rear entrance frame.

3. Spring mechanisms as defined in claim 1, in which said means for securely attaching each said bottom end comprises:
a pair of yoke members each of which securely holds one of said bottom ends of said elastic spring means springs, each of said yoke members being securely attached at its bottom to the inner surface of one of said flange members.

4. A spring mechanism assembly which facilitates the movement of a trailer ramp door, and having a spring mechanism that is completely protected from weather elements when said trailer ramp door is closed, comprising:
an elastic spring means having a top end and a bottom end, said elastic spring means providing dampening of the downward movement of said trailer ramp door and providing lifting assistance for the upward movement of said trailer ramp door;
a side member of a trailer rear entrance frame to which said trailer ramp door is attached, said side member having an opening formed on its top surface formed to receive said elastic spring means and formed to completely enclose said elastic spring means in conjunction with said trailer ramp door when said trailer ramp door is closed;
means for securely attaching said top end of said elastic spring means inside said opening slot, and
means for securely attaching said bottom end of said elastic spring means to the inner surface of a flange member formed from and extending outwardly from a side member of said trailer ramp door;
whereby said elastic spring means facilitates both the opening of said trailer ramp door and the closing of said trailer ramp door, and said closing of said trailer ramp door inserts said elastic spring means into said opening and simultaneously causes said flange member to completely cover said elastic spring means while said elastic spring means is in said opening, thereby completely enclosing said elastic spring means in said opening and providing complete protection of said elastic spring means from weather elements.

5. A spring mechanism assembly as defined in claim 4, in which said means for securely attaching said top end of said elastic spring means comprises:
a yoke member which securely holds said top end of said elastic spring means, said yoke member being inserted into said opening slot and securely attached to the inner surface of said side member of said tubular rectangular trailer rear entrance frame.

6. A spring mechanism assembly as defined in claim 4, in which said means for securely attaching said bottom end of said elastic spring means comprises:
a yoke member which securely holds said bottom end of said elastic spring means, said yoke member being securely attached at its bottom to said inner surface of said flange member.

7. A spring mechanism assembly which facilitates the movement of a trailer ramp door, and having a spring mechanism that is completely protected from weather elements when said trailer ramp door is closed, comprising:
an elastic spring means having a top end and a bottom end and an effective tensile strength and an effective load capacity sufficient to facilitate movement of said trailer ramp door by providing dampening of downward movement of said trailer ramp door and providing lifting assistance for upward movement of said trailer ramp door;
a longitudinal flange member formed from and extending along a side of a trailer ramp frame to which said trailer ramp door is affixed;
means for securely attaching the bottom end of said elastic spring means to the inner surface of said longitudinal flange member;
a side member of a trailer rear entrance frame having
a longitudinal opening formed on the outer surface of said side member of a trailer rear entrance frame, said longitudinal opening formed to receive the entire length of said elastic spring means and formed to be closed and to completely enclose said elastic spring means in conjunction with said longitudinal flange member when said trailer ramp door is closed;
means for securely attaching the top end of said elastic spring means inside said longitudinal opening to the inner surface of said side member;
whereby said elastic spring means facilitates both the opening of said trailer ramp door and the closing of said trailer ramp door, and said closing of said trailer ramp door inserts said elastic spring means into said longitudinal opening and simultaneously causes said flange member to completely cover said elastic spring means while said elastic spring means is in said longitudinal opening, thereby completely enclosing said elastic spring means in said longitudinal opening and providing complete protection of said elastic spring means from weather elements.

8. A spring mechanism assembly as defined in claim 7, in which said means for securely attaching said bottom end of said elastic spring means comprises:
a yoke assembly securely holding said bottom end of said elastic spring means, said yoke assembly being securely attached at its bottom to said inner surface of said longitudinal flange member.

9. A spring mechanism assembly as defined in claim 7, in which said means for securely attaching said top end of said elastic spring means comprises:
a yoke assembly securely holding said top end of said elastic spring means, said yoke assembly being inserted inside through said longitudinal opening and securely attached at its bottom to said inner surface of said side member.

10. A spring mechanism assembly as defined in claim 7 in which said effective tensile strength of said elastic spring means is about 165–185 lbs., and said effective load capacity of said elastic spring means is up to about 340 lbs.

* * * * *